United States Patent
Novice et al.

(10) Patent No.: US 9,294,520 B2
(45) Date of Patent: Mar. 22, 2016

(54) ENTITLEMENT FOR CALL ROUTING AND DENIAL

(75) Inventors: David Novice, Baltimore, MD (US); Peter Gits, Clarendon Hills, IL (US); Dale Seavey, Sunol, CA (US)

(73) Assignee: Cisco Technology, Inc., San Jose, CA (US)

( * ) Notice: Subject to any disclaimer, the term of this patent is extended or adjusted under 35 U.S.C. 154(b) by 2370 days.

(21) Appl. No.: 11/497,677

(22) Filed: Aug. 2, 2006

(65) Prior Publication Data

US 2008/0046586 A1 Feb. 21, 2008

(51) Int. Cl.
| | |
|---|---|
| *H04M 1/00* | (2006.01) |
| *H04L 29/06* | (2006.01) |
| *H04L 12/58* | (2006.01) |
| *H04M 3/22* | (2006.01) |
| *H04M 3/38* | (2006.01) |

(52) U.S. Cl.
CPC .......... *H04L 65/1076* (2013.01); *H04L 12/585* (2013.01); *H04L 51/12* (2013.01); *H04L 63/10* (2013.01); *H04L 12/581* (2013.01); *H04L 51/04* (2013.01); *H04M 3/2281* (2013.01); *H04M 3/38* (2013.01)

(58) Field of Classification Search
CPC . H04L 41/0213; H04L 47/10; H04L 12/5602; H04L 29/06027; H04L 49/25; H04L 29/06; H04M 1/82; H04M 7/006; H04M 3/42042; H04M 3/42059; H04M 15/8351; H04M 15/63; H04M 3/42102; H04M 3/42068; H04M 3/5232; H04M 3/543; H04Q 11/0478; H04Q 2213/13204
USPC .......... 379/372, 142.01, 142.05, 130, 142.09, 379/201.02, 211.02, 218.01, 220.01, 379/221.14, 265.11, 266.08, 93.01; 370/229–236.1, 352–356; 709/232
See application file for complete search history.

(56) References Cited

U.S. PATENT DOCUMENTS

| | | | |
|---|---|---|---|
| 6,275,573 B1 * | 8/2001 | Naor et al. ..................... 379/194 |
| 2002/0122547 A1 * | 9/2002 | Hinchey ................ H04M 7/006 |
| | | | 379/221.01 |
| 2004/0088546 A1 | 5/2004 | Shah et al. |
| 2005/0201362 A1 * | 9/2005 | Klein et al. .................... 370/352 |
| 2005/0259802 A1 * | 11/2005 | Gray .................... H04M 3/4217 |
| | | | 379/201.01 |
| 2005/0271051 A1 * | 12/2005 | Holloway et al. .............. 370/389 |
| 2006/0098583 A1 * | 5/2006 | Baker et al. .................... 370/252 |
| 2007/0025537 A1 * | 2/2007 | Claudatos ........... H04M 3/2281 |
| | | | 379/202.01 |
| 2008/0104708 A1 * | 5/2008 | Kerschbaum .......... G06F 21/62 |
| | | | 726/27 |

* cited by examiner

*Primary Examiner* — Akelaw Teshale
(74) *Attorney, Agent, or Firm* — Parker Ibrahim & Berg LLC; James M. Behmke; Stephen D. LeBarron (57) ABSTRACT

In one embodiment, a network device enforces entitlement rules based on call control traffic received. The call control traffic is received at the network device from an application associated with a first user for a second user. The network device determines identification information for the first user and/or the second user. The network device then determines an action to take based on an entitlement policy associated with the first user or the second user. The action is then performed. The network device enforces the entitlement policy without any modification to the application to cause the call control traffic to be routed through the network device. The network device is in the call control path but does not appear to be a participant in the call to the first application.

24 Claims, 5 Drawing Sheets

ENTITLEMENT FOR CALL ROUTING AND DENIAL

TECHNICAL FIELD

Embodiments of the present invention generally relate to networking and more specifically to techniques for providing entitlement using a network device in the network.

BACKGROUND

Regulations may require that certain users should not call other users. For example, Sarbanes-Oxley (SOX) includes a set of requirements where a user from the auditing side of a company is not allowed to place a phone call or have an instant messaging (IM) session with someone from the business consulting side of the company. Conventionally, telephony and IM systems do not enforce which caller or IM client can communicate with which callee/buddy.

Applications may be modified to route calls through a gateway or proxy. In this case, the gateway or proxy address is physically configured in a user's client, such as a user's IM client or VoIP telephone. Accordingly, the application is manually configured to send all traffic through the gateway or proxy, which can then monitor the communications. This approach, however, requires modifying the application on each user's desktop. This is time consuming and changes the application's normal behavior in sending communications to other users. Further, when the applications or gateways are changed to different vendors, the modification of the applications has to be performed again.

DESCRIPTION OF EXAMPLE EMBODIMENTS

Embodiments of the present invention provide entitlement for call routing/denial. A network device is provided that enforces entitlement rules based on call control traffic received. The call control traffic is received at the network device from an application associated with a first user for a second user. The network device determines identification information for the first user and/or the second user. The network device then determines an action to take based on an entitlement policy associated with the first user or the second user. The action is then performed.

The network device enforces the entitlement policy without any modification to the application to cause the call control traffic to be routed through the network device. The network device is in the call control path but does not appear to be a participant in the call to the first application.

Figure 1:
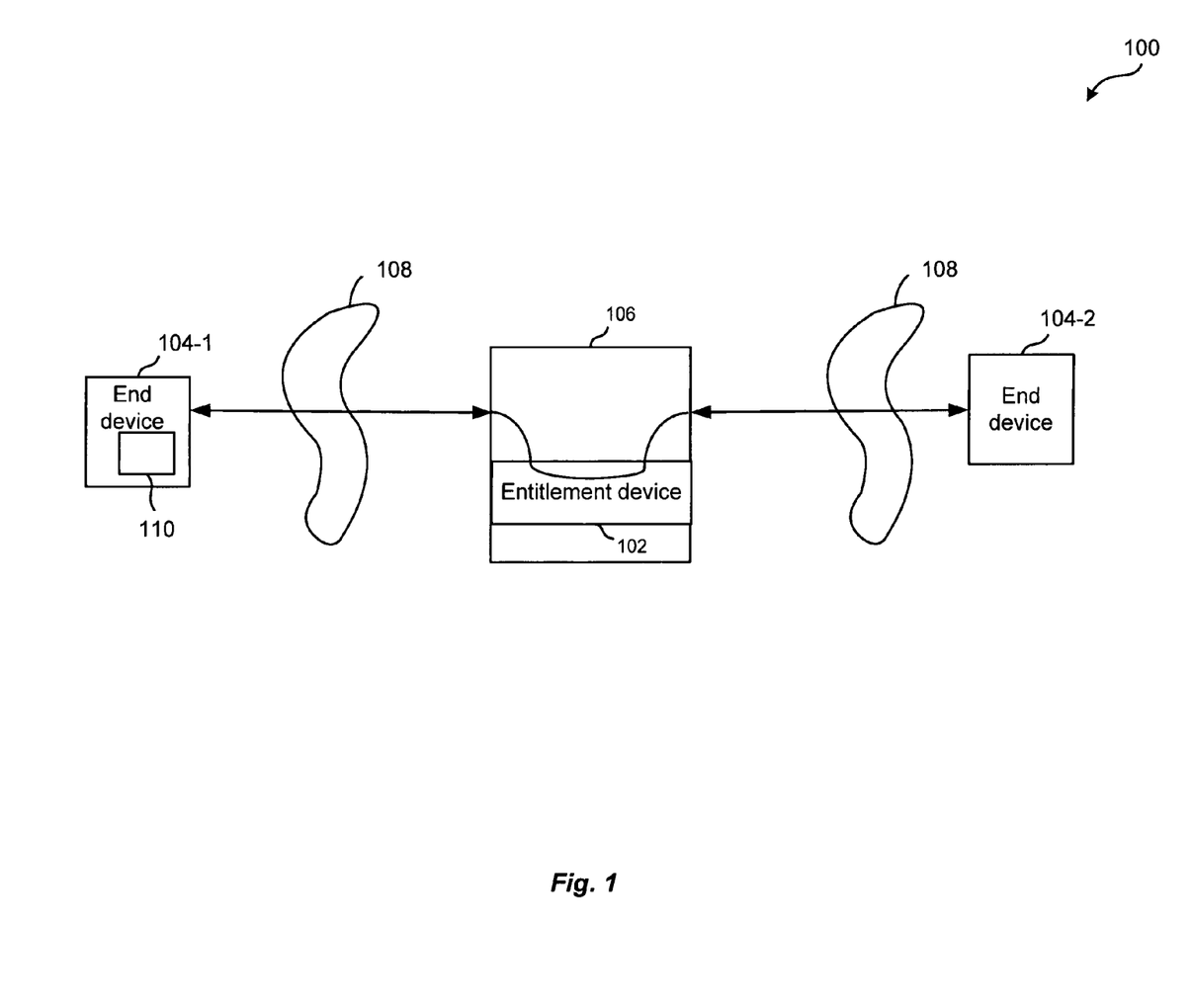
FIG. 1 depicts a system for providing entitlement according to one embodiment of the present invention.

FIG. 1 depicts a system 100 for providing entitlement according to one embodiment of the present invention. System 100 includes an entitlement device 102, end devices 104, and a router 106. Devices in system 100 may communicate through a network 108.

End devices 104 may be any telecommunications devices. For example, end device 104-1 may include public switched telephone network (PSTN) telephones, cellular phones, voice over Internet protocol (VoIP) telephones, computers, personal digital assistants (PDAs), voice enabled IM clients, soft phones, etc.

End devices 104 include an application 110 that may be configured to send/receive communications for user. For example, application 110 may include an instant messaging client, VoIP application, etc. Application 110 is used to communicate with other users/devices.

Router 106 may be a network device configured to route communications. For example, router 106 may be a proxy, switch, router, back to back user agent (B2BUA), etc. Router 106 may be part of a signaling and media path between end device 104-1 and end device 104-2 for a communication. (e.g., a call). Router 106 is configured to be in a signaling path used to set up the communication from end device 104-1 to end device 104-2. For example, router 106 may terminate the signaling and media streams. In this case, router 106 may be seen as a participant in a communication by end devices 104-1 and 104-2. Router 106 is registered and provisioned as part of the signaling path and is also included in as a via (part of a hop) for the signaling and media streams.

Entitlement device 102 may be a network device that receives call signaling and media from router 106. Entitlement device 102 may be part of gateway or router 106. For example, entitlement device 102 may be a blade in router 106. In another embodiment, entitlement device 102 may be part of another router (not shown). In either case, call signaling and media streams may be redirected to/from entitlement device 102 by router 106.

Entitlement device 102 is configured to inject entitlement policy for a caller according to embodiments of the present invention. For example, entitlement device 102 may be situated in network 108 and receives call control traffic from application 110 for end device 104-2, which is associated with a callee. The call control traffic may include signaling or any other information for a call. For example, the call control traffic may be signaling to set up a call between a caller and a callee. A call may be any communication from application 110, such as a typical user to user call or a registration request to a proxy, etc. for a voice call or instant message. When the term "call" is used, it may be any communication, such as signaling or media for a voice call, instant message, or any other communication. Also, the call control traffic may be for any protocol, such as session initiation protocol (SIP), H.323, etc.

Entitlement device 102 may then analyze the call control traffic and apply an entitlement policy associated with the first user and/or second user to the call control traffic. Entitlement device 102 then determines an action to perform based on the application of the entitlement policy. For example, a policy may be that a first user cannot contact a second user. In this case, entitlement device 102 determines that a call should not be allowed between the first user and the second user. Entitlement device 102 sends call control traffic back to application 110 that indicates that the call is not allowed. Or, in another embodiment, a busy signal may be sent. Entitlement device 102 may also perform other actions. For example, entitlement device 102 may log that the first user had attempted to contact the second user. This may comply with regulations, such as Sarbanes-Oxley.

Entitlement device 102 injects entitlement policy for communications from application 110 without having to modify application 110 to route communications through entitlement device 102. For example, application 110 does not need to be modified to include custom entitlement client-side or server-side libraries. Conventionally, application 110 had to be configured to be routed through a specific network device, which can then perform actions on the communications. However, in embodiments of the present invention, entitlement device 102 is in the call control path and intercepts communications from application 110 to end device 104-2 as they are being sent to end device 104-2.

In one embodiment, the address of entitlement device 102 is not hard-coded into application 110. Rather, entitlement device 102 is in the control signaling path but does not appear as a proxy of end devices 104 as a participant in the call. A protocol, such as web caching content protocol (WCCP), may be used to route the control signaling stream through entitlement device 102 without the existing participant's knowledge (e.g., end devices 104 are unaware of the existence of entitlement device 102). Additionally, entitlement device 102 is not directly configured in the media path, that is, it does not terminate the media stream. This is different from a back to back user agent (B2BUA), which terminates a media and control signaling stream. The B2BUA is in the path and is part of a via address for packets sent in the control signaling stream and media stream. The B2BUA is also seen as a participant in the call and is considered a hop in the routing of the media and control signaling stream. However, entitlement device 102 subscribes to router 106 for control signaling and media that is being sent between end devices 104 and router 106 redirects the control signaling traffic through entitlement device 102.

A communication is directed to end device 104-2 and intercepted by entitlement device 102. The entitlement device 102 receives the call control traffic because it previously subscribed to router 106 to receive the traffic. However, entitlement device 102 does not appear to be a participant in the call to router 106 or application 110. It and does not terminate the call control traffic to create a separate call leg, as does a back to back user agent (B2BUA). It maintains the same call id and acts as a network element not an addressable proxy (otherwise the via field would show up in the flow as within SIP). Accordingly, no customization is needed to application 110 to provide the entitlement enforcement.

By not being configured in the path, entitlement device 102 does not need to be registered (or included by a DNS srv record) or provisioned as part of the path. In this case, administrators do not need to configure application 110 to route communications through entitlement device 102. Also, agreements with IM companies to create bots to create separate sessions for communications are not needed.

Figure 2:
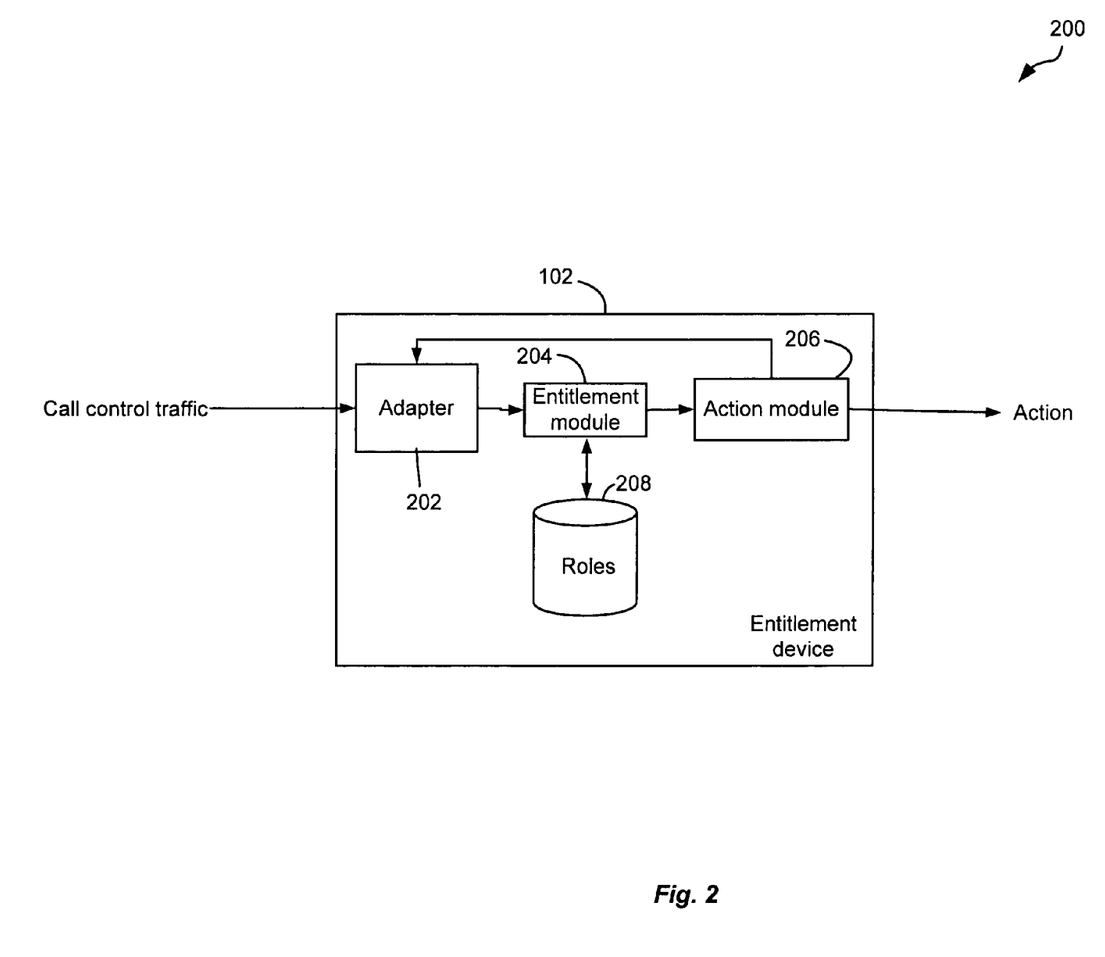
FIG. 2 depicts an embodiment of an entitlement device according to embodiments of the present invention.

FIG. 2 depicts a more detailed embodiment of entitlement device 102 according to embodiments of the present invention. As shown, entitlement device 102 includes an adapter 202, an entitlement module 204, an action module 206, and storage 208.

Adapter 202 receives call control traffic from application 110 through a router 106. The call control traffic may be signaling that is sent to set up a call between application 110 and end device 104-2. For example, the call control traffic may be a SIP message, such as an INVITE message. Also, the call control traffic may be any other information, such as media for a call, etc.

Multiple adapters 202 may be provided for different protocols. For example, adapters for voice protocols, such as SIP, H.323, WCCP, etc., and for IM protocols, such as XMPP, SIMPLE, etc. may be provided. Thus, entitlement device 102 may be compatible with various applications 110 and the protocols the applications use to communicate.

After receiving the call control traffic, adapter 202 sends it to entitlement module 204. Entitlement module 204 is configured to enforce an entitlement policy. In one embodiment, entitlement module 204 determines identification information for a caller and/or a callee. A caller is a first user associated with end device 104-1/application 110 and a callee is a second user associated with end device 104-2.

The identification information may be determined from the call control traffic. A device name may be available in the call control traffic and it is mapped it to a username. For example, end devices 104 may have device identifiers, such as such as a telephone number "555-5555", an address for a SIP device, such as 555-5555@sip.cisco.com, or an IM username, such as "Bob@sametime.cisco.com." Part of the device identifier, such as "Bob" in the IM username, or a name for associated with a telephone number may be used to determine the identification information. For example, the telephone number "555-5555" may map to the username of "Bob".

Entitlement module 204 then may determine an action to take. In one embodiment, roles stored in storage 208 are used to determine entitlement logic to apply to the call control traffic. Each user may be associated with a role, which may be a classification or category. Entitlement module 204 applies rules to determine which roles are entitled to communicate with which other roles.

Figure 3:
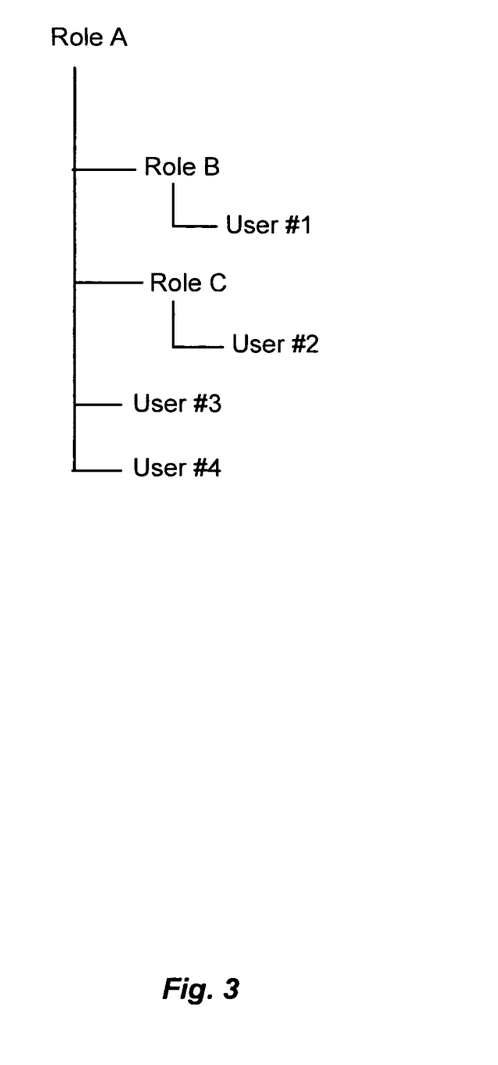
FIG. 3 depicts an example of roles assigned to users according to one embodiment of the present invention.

FIG. 3 depicts an example of roles assigned to users according to one embodiment of the present invention. As shown, roles A, B, and C are provided. From the tree, if a user is assigned role A, the user can communicate with any other roles that are subsets of role A. For example, roles B and C are subsets of role A, and thus users #3 and #4 may communicate with any users in roles A, B, and C. However, users in role B cannot communicate with users in role C, and vice versa. Thus, user #2 cannot contact user #1, and vice versa. But, users in role B may communicate with users in role A because they are a subset of Role A. For example, user #1 may contact user #3 or user #4. Although this structure of the roles is provided, it will be understood that other embodiments of assigning roles will be appreciated.

Referring back to FIG. 2, entitlement module 204 applies rules to the roles assigned to the caller and callee. For example, if user #1 is attempting to contact user #2, then the entitlement rules determine that this call should be disallowed. However, if user #1 is attempting to contact user #3, then the entitlement rules indicate that this call should be allowed.

Entitlement module 204 then notifies action module 206 to perform an action. In one embodiment, the action may allow the call to go through as requested by the call control traffic. Also, action module 206 may modify the call control traffic or inject other actions into the call control traffic. In one example, the caller ID string may be modified to show that the message has been approved. For example, the word "approved" or "Sarbanes-Oxley compliant" may be inserted into the identification information for the first user or second user. Thus, when the second user receives the call from the first user, the caller ID information may indicate "approved" or "Sarbanes-Oxley compliant", and may also include the first user's name.

Another action includes supplementing the call control traffic to cause end device 104-2 to ring with a distinctive tone that would indicate approval. Also, other actions may be appreciated.

If the call is disallowed, then action module 206 may not allow the call to go through. Also, action module 206 may send a call control message back to application 110 indicating the call was not allowed. For example, a busy signal may be sent, such as a SIP busy signal, or a message may be sent to notify the first user that the call has not been allowed to the second user. For example, a call control message may be sent that includes information that states "We are sorry. You are not allowed to call this party due to regulatory requirements. This attempt has been logged and will be recorded."

If the call is disallowed, action module 206 may also perform actions related to the regulatory requirements. For example, as mentioned in the message above, action module 206 may log the call. Thus, the regulations may be complied with automatically.

Figure 4:
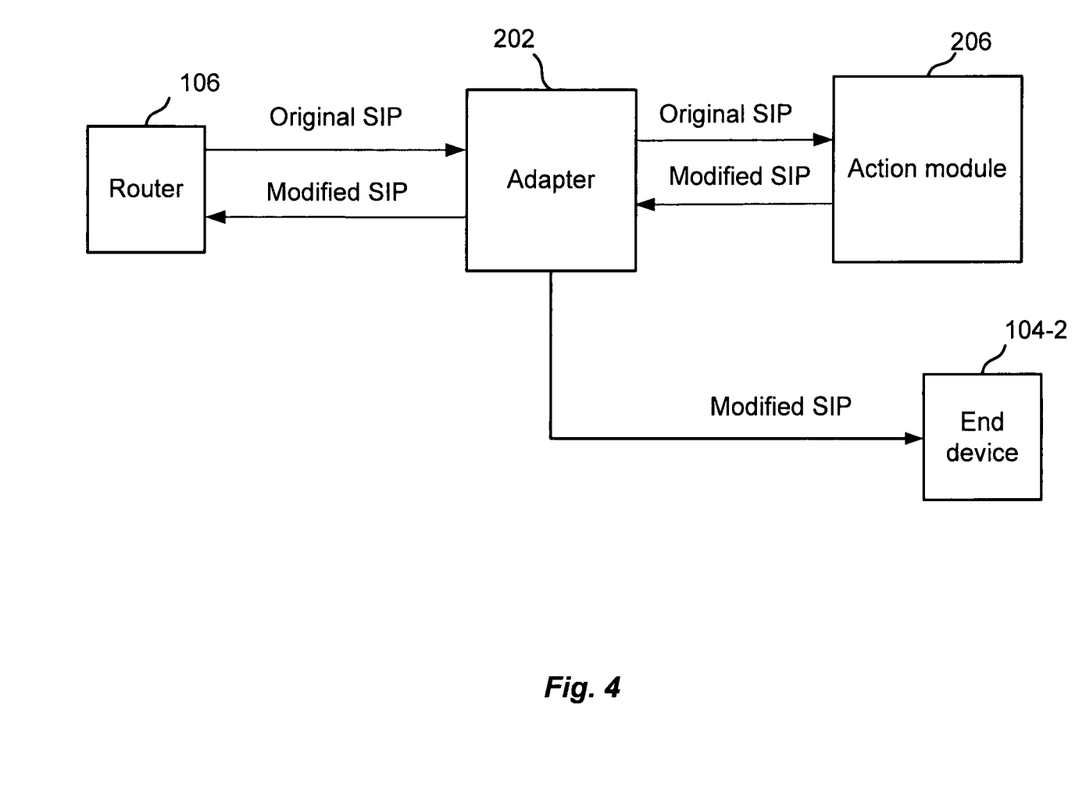
FIG. 4 shows a call flow according to one embodiment of the present invention.

FIG. 4 shows a call flow according to one embodiment of the present invention. This call flow occurs before a connection for a call is made between a caller and a callee. The call flow includes signaling that is sent to set up a call.

As shown, an original SIP message is sent from router 106 to adapter 202. Adapter 202 may not be in the call flow with end device 104-1 but may subscribe to the router 106 to receive call control traffic from end device 104-1. The path of information is from the switch or router to the Adapter 202, it acts as a network element so the clients are unaware of the network route. Adapter 202 sends the original SIP message to action module 206 through entitlement module 204. This message may be a SIP INVITE message.

In one embodiment, action module 206 may send a modified SIP message to adapter 202. Also, a go or no-go flag may be set in the modified SIP message. For example, the no-go flag may indicate that the communication to the second user is not allowed. If the no-go flag is set, action module 206 may also log the communication. Also, adapter 202 may not allow the call to be completed. For example, adapter 202 may send an error message (call denied) to router 106.

A go flag may indicate the communication is allowed. Action module 206 may send a go response with a modified SIP message back to SIP adapter 202. Adapter 202 then sends a modified SIP message to end device 104-2. The modified SIP message may be a 100 Trying message. The 100 Trying message may be modified to include information, such as caller ID information indicating the call is Sarbanes-Oxley compliant.

Figure 5:
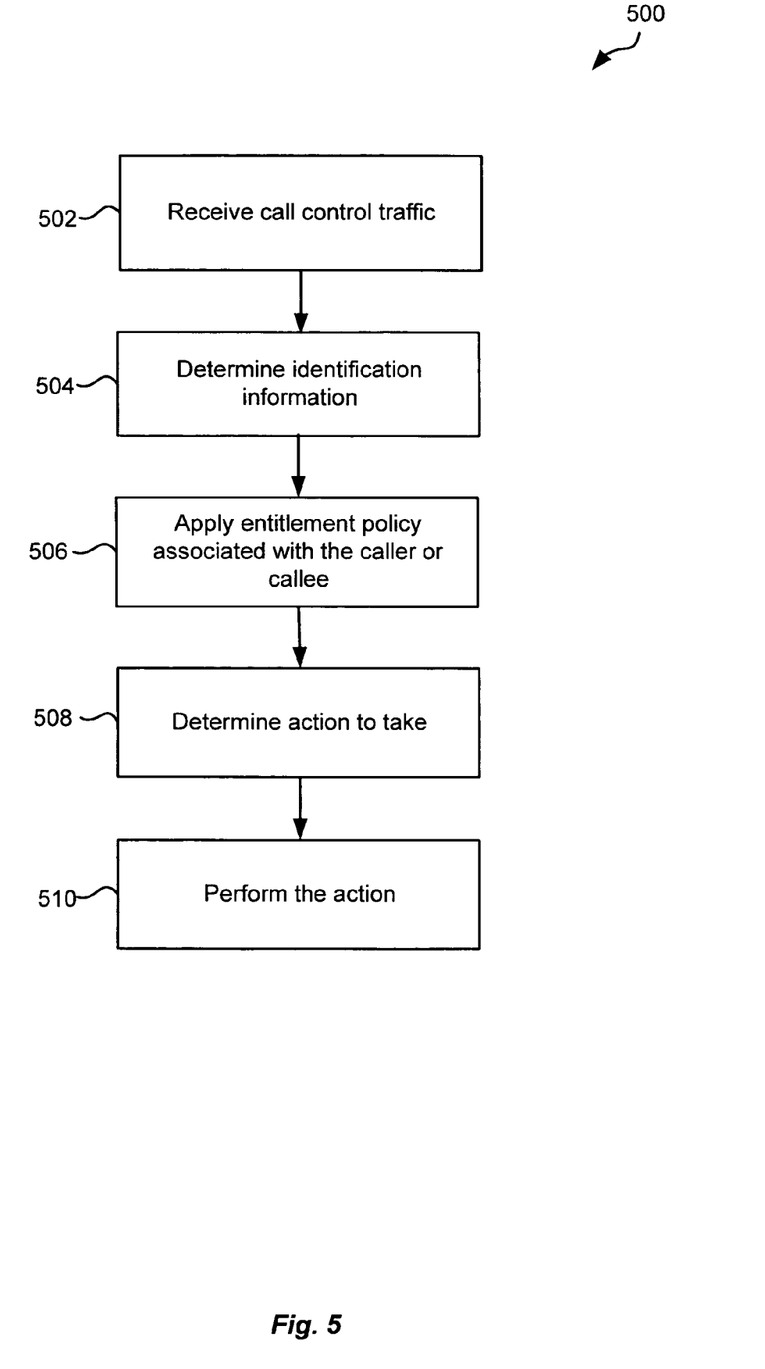
FIG. 5 depicts a simplified flow chart of a method for providing entitlement according to one embodiment of the present invention.

FIG. 5 depicts a simplified flow chart of a method for providing entitlement according to one embodiment of the present invention. In step 502, entitlement device 102 receives call control traffic.

in step 504, entitlement device 102 determines identification information for the caller and the callee.

In step 506, entitlement device 102 applies an entitlement policy associated with the caller or the callee. In step 508, an action to take is then determined and in step 510, the action is performed.

Entitlement device 102 may be used in various scenarios and does not need to be used when a caller calls a callee. For example, when a telephone boots up and sends a register request, entitlement device 102 may perform an entitlement check on the register request. In this case, the callee or second user may be proxy configured to register the user. If it is determined that the user booting up the telephone is not allowed to register, then entitlement device 102 does not allow the registration. This may be useful when devices such as those from terminated employees attempt to register. These devices will not be allowed to register and thus will not receive phone calls.

Embodiments of the present invention provide many advantages. For example, entitlement is injected into applications without having to modify the application itself. This relieves administrators from manually configuring applications at end devices. Thus, applications do not need any customization to have entitlement enforced. This provides significant cost savings in that extra hardware to provide entitlement is not needed by a business. For example, businesses previously would have to buy gateways and proxies and configure their applications to route all traffic through those gateways and proxies, which then could enforce entitlement policies. However, using entitlement device 102, manually configuring an application to route call control traffic through it is not required. This is because entitlement device 102 self subscribes to either the router 106 to receive call control traffic. This is done such that entitlement device 102 does not appear as a participant in the call. Thus, application 110 is not aware entitlement device is in the call control path.

Although the invention has been described with respect to specific embodiments thereof, these embodiments are merely illustrative, and not restrictive of the invention. Although call control traffic is described, it will be recognized that call control traffic may also include any information may be used to apply an entitlement policy for a callee.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:

receiving, at a network device, call control traffic for a communication to a destination device, the call control traffic being from an application associated with a first user at a source device;

determining, by the network device, identification information for the first user and a second user, the second user being associated with the destination device, wherein the first and second user identification information is determined by performing mappings from the call control traffic to names of the first and second users;

based on the identification information for the first and second user, determining, by the network device, a role of the first user within an organization with which the first user is associated, a role of the second user within an organization with which the second user is associated, and a relationship between the first user's role within the organization with which the first user is associated and the second user's role within the organization with which the second user is associated, wherein the roles and relationships are defined by regulation as to whether the first user can communicate with the second user;

determining, by the network device, an action to take based on an entitlement policy associated with the relationship between the first user's role at the organization and the second user's role at the organization; and performing, by the network device, the action on the call control traffic, wherein the entitlement policy is enforced without modifying the application associated with the first user at the source device.

2. The method of claim 1, wherein performing the action comprises approving a connection from the source device to the destination device.

3. The method of claim 1, wherein performing the action comprises denying a connection from the source device to the destination device.

4. The method of claim 1, wherein performing the action comprises modifying the call control traffic.

5. The method of claim 4, wherein modifying the call control traffic comprises adding information to the call control traffic.

6. The method of claim 4, wherein modifying the call control information comprises modifying the call control traffic to cause a denial of the communication to the destination device.

7. The method of claim 1, wherein performing the action comprises logging a record of the communication.

8. The method of claim 1, wherein the call control traffic is signaling for setting up the communication to the destination device.

9. The method of claim 1, wherein the network device subscribes to a router for control signaling and media streams that are being sent from the source device to the destination device.

10. The method of claim 1, wherein the network device is not provisioned or registered as part of a path for the communication from the source device to the destination device.

11. An apparatus comprising:
an adapter configured to receive call control traffic for a communication to a destination device, the call control traffic being from an application associated with a first user at a source device;
an identification determiner configured to:
determine identification information for the first user and a second user, the second user being associated with the destination device, wherein the first and second user identification information is determined by performing mappings from the call control traffic to names of the first and second users, and
determine, based on the identification information for the first and second user, a role of the first user within an organization with which the first user is associated, a role of the second user within an organization with which the second user is associated, and a relationship between the first user's role within the organization with which the first user is associated and the second user's role within the organization with which the second user is associated, wherein the roles and relationships are defined by regulation as to whether the first user can communicate with the second user;
an entitlement module configured to determine an action to take based on an entitlement policy associated with the relationship between the first user's role at the organization and the second user's role at the organization; and
an action module configured to perform the action on the call control traffic, wherein the entitlement policy is enforced without modifying the application associated with the first user at the source device.

12. The apparatus of claim 11, wherein the action module is configured to approve a connection from the source device to the destination device.

13. The apparatus of claim 11, wherein the action module is configured to deny a connection from the source device to the destination device.

14. The apparatus of claim 11, wherein the action module is configured to modify the call control traffic.

15. The apparatus of claim 14, wherein the action module is configured to add information to the call control traffic.

16. The apparatus of claim 14, wherein the action module is configured to modify the call control traffic to cause a denial of the communication to the destination device.

17. The apparatus of claim 11, wherein the action module is configured to log a record.

18. The apparatus of claim 11, wherein the call control traffic is signaling for setting up the communication to the destination device.

19. The apparatus of claim 11, wherein the apparatus subscribes to a router for control signaling and media streams that are being sent from the source device to the destination device.

20. The apparatus of claim 11, wherein the apparatus is not provisioned or registered as part of a path for the communication from the source device to the destination device.

21. An apparatus comprising:
an adaptor configured to receive call control traffic at the apparatus for a communication to a destination device, the call control traffic being from an application associated with a first user at a source device;
an identification determiner configured to determine identification information for the first user and a second user, the second user being associated with the destination device, wherein the first and second user identification information is determined by performing mappings from the call control traffic to names of the first and second users;
means for determining, based on the identification information for the first and second user, a role of the first user within an organization with which the first user is associated, a role of the second user within an organization with which the second user is associated, and a relationship between the first user's role within the organization with which the first user is associated and the second user's role within the organization with which the second user is associated, wherein the roles and relationships are defined by regulation as to whether the first user can communicate with the second user;
means for determining an action to take based on an entitlement policy associated with the relationship between the first user's role at the organization and the second user's role at the organization; and
an action module configured to perform the action on the call control traffic, wherein the entitlement policy is enforced without modifying the application associated with the first user at the source device.

22. The method of claim 1, wherein the entitlement policy is defined to promote compliance with governmental regulations and to indicate particular relationships between the first user's role and the second user's role for which a connection between the source device and the destination device is to be denied.

23. The method of claim 1, wherein the organization with which the first user is associated and the organization with which the second user is associated are the same organization.

24. The method of claim 1, wherein receiving, the communication is an instant message (IM) communication.

* * * * *

UNITED STATES PATENT AND TRADEMARK OFFICE
CERTIFICATE OF CORRECTION

| | | |
|---|---|---|
| PATENT NO. | : 9,294,520 B2 | Page 1 of 1 |
| APPLICATION NO. | : 11/497677 | |
| DATED | : March 22, 2016 | |
| INVENTOR(S) | : David Novice et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2377 days.

Signed and Sealed this
Fourteenth Day of June, 2016

Michelle K. Lee
*Director of the United States Patent and Trademark Office*